(12) United States Patent
Lu et al.

(10) Patent No.: US 10,372,383 B2
(45) Date of Patent: Aug. 6, 2019

(54) PROVIDING SECURE ACCESS TO DATA IN MOBILE DEVICES

(71) Applicant: EMC Corporation, Hopkinton, MA (US)

(72) Inventors: Patrick Minggang Lu, Shanghai (CN); Chao Chen, Shanghai (CN); Grissom Tianqing Wang, Shanghai (CN); Yong Que, Shanghai (CN); Lu Lei, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 36 days.

(21) Appl. No.: 15/095,920

(22) Filed: Apr. 11, 2016

(65) Prior Publication Data

US 2016/0306988 A1     Oct. 20, 2016

(30) Foreign Application Priority Data

Apr. 15, 2015  (CN) .......................... 2015 1 01787606

(51) Int. Cl.

| | |
|---|---|
| H04L 29/06 | (2006.01) |
| G06F 3/06 | (2006.01) |
| H04W 12/08 | (2009.01) |
| G06F 16/245 | (2019.01) |
| G06F 16/22 | (2019.01) |
| G06F 13/16 | (2006.01) |
| G06F 13/40 | (2006.01) |
| G06F 21/62 | (2013.01) |

(52) U.S. Cl.
CPC ............ *G06F 3/0683* (2013.01); *G06F 3/061* (2013.01); *G06F 3/0629* (2013.01); *G06F 13/16* (2013.01); *G06F 13/4068* (2013.01); *G06F 16/2255* (2019.01); *G06F 16/245* (2019.01); *G06F 21/6272* (2013.01); *H04W 12/08* (2013.01); *G06F 2221/2111* (2013.01); *G06F 2221/2143* (2013.01)

(58) Field of Classification Search
USPC .......................................................... 726/30
See application file for complete search history.

(56) References Cited

U.S. PATENT DOCUMENTS

| | | | | |
|---|---|---|---|---|
| 6,598,142 | B2* | 7/2003 | Paavilainen | ......... G06Q 20/341 |
| | | | | 711/103 |
| 7,831,682 | B2* | 11/2010 | Certain | ............... G06F 11/1451 |
| | | | | 707/639 |

(Continued)

FOREIGN PATENT DOCUMENTS

CN          101064604 A        10/2007

*Primary Examiner* — Harris C Wang
(74) *Attorney, Agent, or Firm* — BainwoodHuang

(57) ABSTRACT

Embodiments of the present disclosure provide a method, system and computer program product for providing a secure access to data in mobile devices by acquiring the data from one of a plurality of remote storage devices in response to receiving an access request for the data from one or more applications; storing the data in a secure memory space in the mobile device; providing the one or more applications with an access to the data in the secure memory space when a predetermined condition is satisfied, wherein the predetermined condition at least comprises the one or more applications having an access permission to the secure memory space.

19 Claims, 6 Drawing Sheets

(56) References Cited

U.S. PATENT DOCUMENTS

| | | | |
|---|---|---|---|
| 8,577,813 B2 † | 11/2013 | Weiss | |
| 8,719,375 B2 | 5/2014 | Hildreth et al. | |
| 9,148,448 B2 * | 9/2015 | Adams | H04L 63/102 |
| 9,292,699 B1 * | 3/2016 | Stuntebeck | G06F 16/13 |
| 9,355,262 B2 * | 5/2016 | Leslie-Hurd | G06F 12/0875 |
| 9,531,696 B2 † | 12/2016 | Weiss | |
| 2008/0194296 A1 * | 8/2008 | Roundtree | G06F 21/62 |
| | | | 455/558 |
| 2009/0138477 A1 * | 5/2009 | Piira | G06F 17/30017 |
| 2010/0017415 A1 * | 1/2010 | Kurumai | H04L 63/104 |
| | | | 707/E17.005 |
| 2011/0029786 A1 * | 2/2011 | Raffard | H04L 63/10 |
| | | | 713/193 |
| 2011/0154447 A1 * | 6/2011 | Dennis | G06F 21/35 |
| | | | 726/4 |
| 2012/0185558 A1 * | 7/2012 | Ryder | H04L 67/1097 |
| | | | 709/217 |
| 2012/0303503 A1 * | 11/2012 | Cambridge | H04L 9/3234 |
| | | | 705/35 |
| 2013/0067564 A1 * | 3/2013 | Fok Ah Chuen | G06F 21/6218 |
| | | | 726/17 |
| 2013/0347075 A1 * | 12/2013 | Narendra | H04W 12/08 |
| | | | 726/4 |
| 2014/0164721 A1 * | 6/2014 | Chakra | G06F 12/122 |
| | | | 711/160 |
| 2014/0173692 A1 * | 6/2014 | Srinivasan | H04W 12/02 |
| | | | 726/4 |
| 2016/0306988 A1 * | 10/2016 | Lu | H04W 12/08 |

\* cited by examiner
† cited by third party

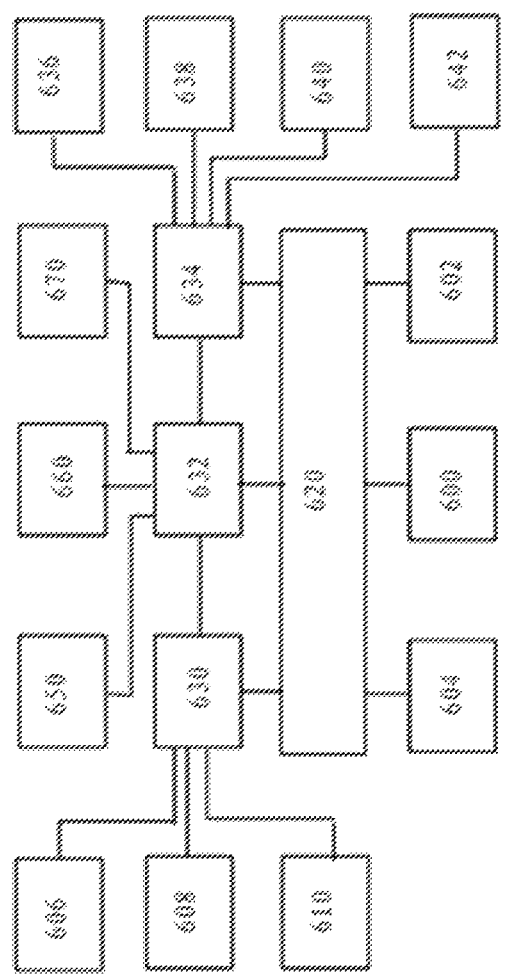

ically the length of encryption, which may be further dependent on an encryption algorithm and mechanism used in the encryption process. Therefore, relatively large investments may be required to acquire an encryption method having superior performance as costs involved may be too high and implementation may be quite complicated. Besides, management of access control list may also results in a high cost and a complicated implementation due to its complex operating mode including maintenance of larger secure access control lists.

PROVIDING SECURE ACCESS TO DATA IN MOBILE DEVICES

RELATED APPLICATION

This application claim priority from Chinese Patent Application Number CN2015101787606, filed on Apr. 15, 2015 at the State Intellectual Property Office, China, titled "METHOD AND SYSTEM FOR PROVIDING SECURE ACCESS TO DATA IN MOBILE DEVICES," the contents of which is herein incorporated by reference in entirety

FIELD OF INVENTION

Example embodiments of the present disclosure relate to the field of data access control.

BACKGROUND OF THE INVENTION

With rapid development of mobile computing technology in recent times, mobile devices (for example, mobile phone, portable computer, personal digital assistant (PDA) and so on) may become a principle device for users to access and process digital information. In such a situation, it may become a trend to use mobile devices to access and process confidential data of enterprise or company or personal confidential information. For example, users, such as employees, may depend more and more upon a mobile working environment, such as mobile Outlook/Office client etc. Users may download confidential information, such as design documents or financial reports, to a personal mobile device for operation. However, such behavior may come with a potential risk of leaking information and introducing critical damage to an enterprise or the person itself.

Generally, a method for solving such problem may include encrypting data or setting access control permissions. However, security of data encryption relies on encryption strength, while encryption strength depends typically on the length of encryption, which may be further dependent on an encryption algorithm and mechanism used in the encryption process. Therefore, relatively large investments may be required to acquire an encryption method having superior performance as costs involved may be too high and implementation may be quite complicated. Besides, management of access control list may also results in a high cost and a complicated implementation due to its complex operating mode including maintenance of larger secure access control lists.

SUMMARY OF THE INVENTION

Accordingly example embodiment of the present disclosure may be related to a method for providing a secure access to data in mobile devices that includes acquiring data from one of a plurality of remote storage devices in response to receiving an access request for the data from one or more applications; storing the data in a secure memory space in the mobile device; providing the one or more applications with an access to the data in the secure memory space when a predetermined condition is satisfied, wherein the predetermined condition at least comprises the one or more applications having an access permission to the secure memory space.

BRIEF DESCRIPTION OF THE DRAWINGS

An exemplary embodiment of the present disclosure are described in details with reference to the drawings, and thus the purposes, features and advantages of the present disclosure will become more apparent, wherein same reference number usually represents the same component in an exemplary embodiment of the present disclosure.

FIG. 6 schematically illustrates an exemplary configuration schematic diagram of a user terminal as shown in FIG. 5.

DETAILED DESCRIPTION

Figure 1:
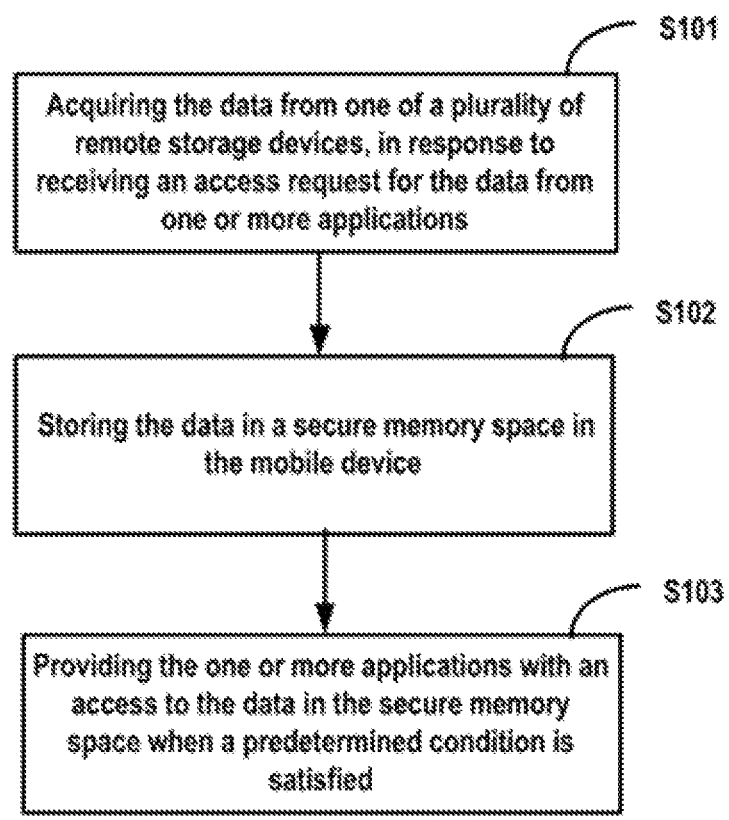
FIG. 1 shows a flow chart of a method 100 for providing a secure access to data in mobile devices in accordance with an exemplary embodiment of the present disclosure.

Some preferred embodiments of the present disclosure will be described more detailed hereinafter with reference to drawings. Although the drawings show preferred embodiments of the present disclosure, it is appreciated, however, that the disclosure may be implemented through various manners and may not be limited by the embodiments set forth herein. On the contrary, the embodiments are provided to clarify and integrate the disclosure and to completely convey the scope of the disclosure to those skilled in the art. Furthermore, similar numbers represent identical or similar components through the drawings.

Accordingly example embodiments of the present disclosure may be related to a method for providing a secure access to data in mobile devices. One embodiment may include acquiring data from one of a plurality of remote storage devices in response to receiving an access request for the data from one or more applications. A further embodiment may include storing data in a secure memory space in a mobile device. A further embodiment may include providing one or more applications with an access to data in a secure memory space when a predetermined condition is satisfied. A further embodiment may include a predetermined condition at least including one or more applications that may be having access permission to a secure memory space.

In a further embodiment, acquiring data from one of a plurality of remote storage devices may include selecting at least one remote storage device from a plurality of remote storage devices based at least partially on geographical location information of a mobile device. In a further embodiment, acquiring the data from one of a plurality of remote storage devices may include acquiring by a selected one remote storage device a most recent update of data from a remote backup storage device based at least partially on access history of a mobile device. A further embodiment may include transmitting updated data to a mobile device.

A further embodiment may include emptying a secure memory space at the end of the access to the data. In a further embodiment, a predetermined condition may include at least one of signature information of an application, a type of an application and a password provided by an application. In a further embodiment, providing an access to data in a secure memory space may include receiving a writing operation for data. A further embodiment may include periodically transmitting written data to at least one remote storage device.

In a further embodiment, a secure memory space may be sized based at least on a number of one or more applications or size of data. In a further embodiment, storing data in a secure memory space in a mobile device may include classifying and storing data in a secure memory space according to an application specific to a data.

One embodiment includes a system for providing a secure access to data in mobile devices. In a further embodiment, an acquiring unit may be configured to acquire data from one of a plurality of remote storage devices in response to receiving an access request for data from one or more applications. In a further embodiment a data operation unit may be configured to store data in a secure memory space in a mobile device. In a further embodiment, an access control unit may be configured to provide one or more applications with an access to data in a secure memory space when a predetermined condition may be satisfied. In a further embodiment, a predetermined condition may at least include one or more applications having access permission to a secure memory space.

In a further embodiment, acquiring data from one of a plurality of remote storage devices may include selecting one remote storage device from a plurality of remote storage devices based at least partially on geographical location information of a mobile device. In further embodiment, acquiring data from one of a plurality of remote storage devices may include acquiring by a selected one remote storage device a most recent update of data from a remote backup storage device based at least partially on access history of a mobile device. A further embodiment may include transmitting updated data to a mobile device.

In further embodiment, the system may include an emptying unit configured to empty a secure memory space at the end of the access to the data. In a further embodiment, a predetermined condition may include at least one of signature information of an application, a type of an application and a password provided by an application. In a further embodiment, providing an access to data in a secure memory space may include receiving a writing operation for a data. A further embodiment may include periodically transmitting written data to at least one remote storage device.

In a further embodiment, a secure memory space is sized based at least on a number of one or more applications or size of a data. In a further embodiment, storing data in a secure memory space in a mobile device may include classifying and storing data in a secure memory space according to an application specific to the data. Based on the above embodiments, convenient and flexible access may be provided to a secure data, thereby reducing costs and improving efficiency.

FIG. 1 shows a flow chart of a method 100 for providing secure access to data in mobile devices in accordance with an exemplary embodiment of the present disclosure. As shown in FIG. 1, after the beginning of the method 100, the method 100 firstly proceeds to step S101 to acquire the data from one of a plurality of remote storage devices in response to receiving an access request for the data from one or more applications. Next, the method 100 proceeds to step S102 to store the data in the secure memory space in the mobile device. Then, the method 100 proceeds to step S103 to provide the one or more applications with an access to the data in the secure memory space when a predetermined condition is satisfied.

In one embodiment, the term "mobile device" here may include, and not be limited to, mobile communication terminal, such as mobile phone, portable computer, such as tablet computer, and any other kinds of mobile devices, such as personal digital assistant and so on. In some embodiments, the term "remote storage device" in step S101 may be a storage device that distinguishes from a storage device within a mobile device. In some other embodiments, a remote storage device may be connected to a mobile device via a network. In some other embodiments, the present disclosure may not be limited to a remote storage connected to a mobile device via a network and other possible connection may also fall within the scope of the present disclosure.

In one embodiment, a remote storage device may be a physical storage device, such as a mobile cloud storage device, which may store secure information, such as data of an enterprise or a company, and other possible information. In a further embodiment, remote storage devices may be often distributed globally and a number of remote storage devices may be more than one. In a further embodiment, each remote storage device may usually correspond to a specific geographical location and may be indexed by geographical information. In a further embodiment, in order to facilitate operations, same information may be stored on a plurality of remote storage devices at a same time. In a further embodiment, once an access request for certain data is received from one or more applications in a mobile device, one of a plurality of remote storage devices may be selected to acquire data based on a predetermined strategy. In an example embodiment, one appropriate remote storage device from a plurality of remote storage devices may be selected based at least partially on a geographical location of a mobile device to acquire data. In a further embodiment, a remote storage device that is geographically closer to a mobile device may be selected in order to save transmission resources.

In one embodiment, in order to facilitate management of data in a plurality of remote storage devices and to avoid data loss, a remote backup storage device may be further provided for a plurality of remote storage devices for storing the data backup in all remote storage devices. In a further embodiment, data updated in each remote storage device may be periodically synchronized to a remote backup storage device to ensure that latest data may be available in a remote backup storage device. In a further embodiment, a remote storage device may also acquire recently updated data from a remote backup storage device as and when required. In an example embodiment, after selecting one remote storage device from a plurality of remote storage devices to acquire data, the selected one remote storage device may firstly acquire a most recent update of the data from the remote backup storage device based at least partially on an access history of a mobile device, and then the updated data may be transmitted to the mobile device to ensure that latest version of data may be available always.

In one embodiment, in step S102 data may be stored in a secure memory space of a mobile device. In a further embodiment, a mobile device herein may include a general memory space and a secure memory space that are independent from each other. In a further embodiment, a general memory space stores general data, which may be accessed by all application running on a mobile device. In a further embodiment, a secure memory space may store only secure data that requires special protection. In a further embodiment, access to secure data may be strictly controlled and may be accessible only when a predetermined condition is satisfied, and will be described hereinafter. According to an exemplary embodiment, a size of a secure memory space may be adjustable. In an example embodiment, it may be determined based at least partially on a number of one or more applications that require an access to a specific data or a size of a specific data to be accessed during a certain time interval. In a further embodiment, data may be classified and stored in a secure memory space according to an application specific to the data.

In one embodiment, step S103 may provide one or more applications with an access to the data in a secure memory space when a predetermined condition is satisfied. In one embodiment, a secure memory space may be accessible only when a predetermined condition is satisfied, wherein the predetermined condition may include at least one or more applications initiating an access request having access permission to a secure memory space. In a further embodiment, a predetermined condition may further include signature information of an application, a type of an application and a password provided by an application. In a further embodiment, in order to ensure data security, when an access is provided to an application, some functions of a mobile device may be disabled, such as screenshot. In a further embodiment, access provided to data in a secure memory space may include both a reading operation and a writing operation, and may also include other possible operations. In a further embodiment, when access is a writing operation, method 100 includes a step of receiving the writing operation for a data and periodically transmitting written data to at least one remote storage device. In a further embodiment, a secure memory space may be emptied at the end of the access to the data.

In a further embodiment, access to a secure data may be conveniently and flexibly controlled by setting a secure memory space in a mobile device and providing access to data in a secure memory space only for an application that may satisfy certain requirements, which may save resources and may improve overall efficiency.

Figure 2:
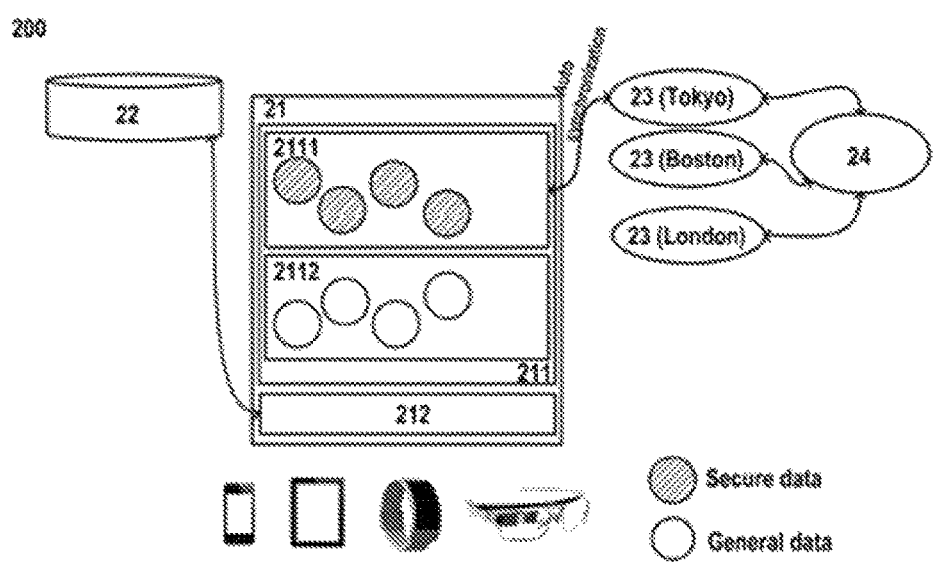
FIG. 2 shows a schematic physical structure 200 for providing a secure access to data in the mobile device 21 in accordance with an exemplary embodiment of the present disclosure.

FIG. 2 shows a schematic physical structure 200 for providing secure access to data in mobile device 21 in accordance with an exemplary embodiment of the present disclosure.

As shown in FIG. 2, mobile device 21 may be a mobile phone, a tablet computer, a wrist-wearable device and a head-wearable device and so on, which includes memory space 211 and security agent 212, wherein memory space 211 includes secure memory space 2111 for storing secure data and general memory space 2112 for storing general data. As an access interface to secure memory space 2111, security agent 212 can execute, for example steps 101 to 103 in method 100, and any other related functions described in combination with steps 101 to 103. For example, security agent 212 may be used to manage secure memory space 2111 and control access to secure memory space 2111, and control automatic data synchronization with remote storage device 23, and keep logs of data modification in a secure memory space, and empty secure memory space 2111 at the end of the access and so on.

Remote storage index server 22 maintains information of remote storage device 23 at each geographical location, and provides remote storage device query service based on the geographical location of a mobile device. Besides, remote storage index server 22 may also maintain various information with respect to the storage size, available size and geometry information of remote storage device 23. Security agent 212 may query such information by accessing remote storage index server 22. Furthermore, remote storage index server 22 may further maintain recent access history of the mobile device and an access control list of the application in the mobile device for inquiry from remote storage device 23.

Remote backup storage device 24 maintains information stored in each remote storage device 23 (for example, distributed in Tokyo, Boston and London and so on). As described in the explanation of method 100, it can periodically receive updated data from each remote storage device 23, and can also provide backup data for remote storage device 23 per request.

Figure 3:
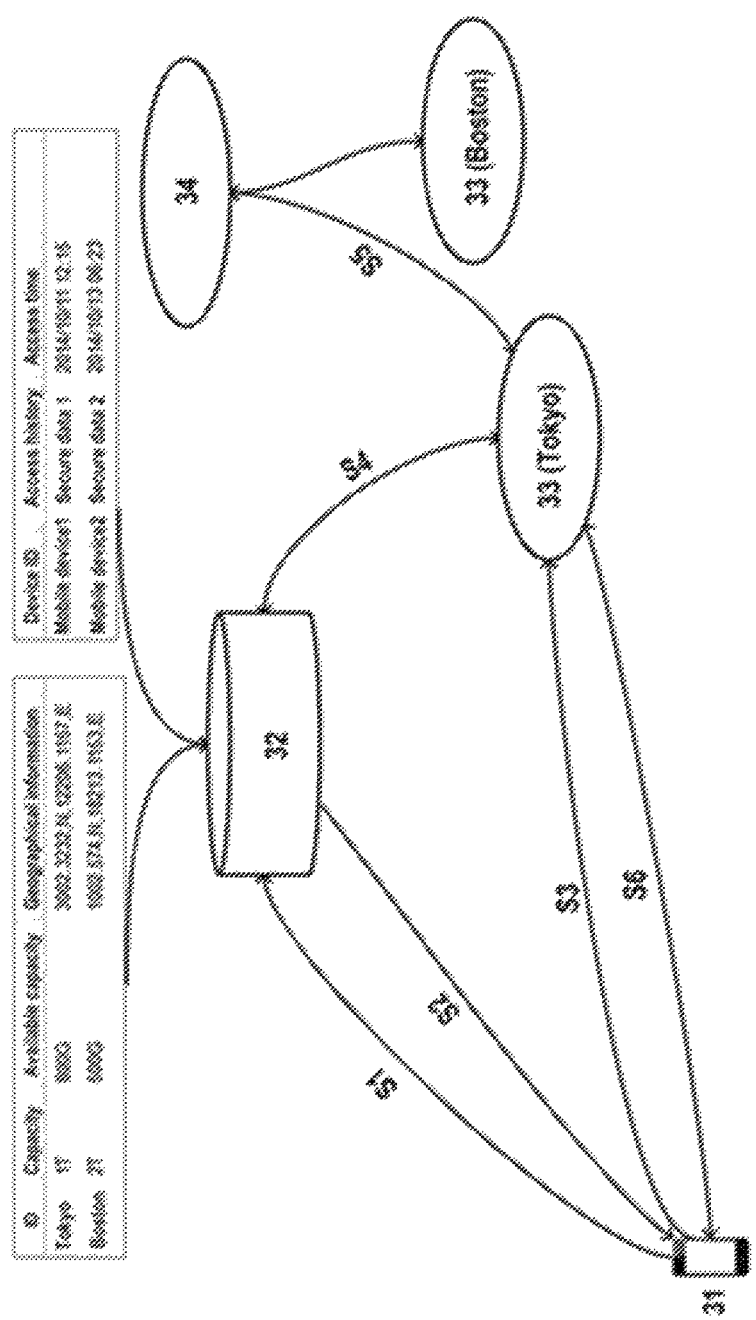
FIG. 3 further shows a process chart 300 for acquiring data from a remote storage device in accordance with an exemplary embodiment of the present disclosure.

Based on the physical structure illustrated in FIG. 2, FIG. 3 further shows a process chart 300 for acquiring data from a remote storage device in accordance with an exemplary embodiment of the present disclosure.

As illustrated in FIG. 3, mobile device 31 sends to remote storage index server 32 with its own geographical location information as a query condition in response to receiving an access request for specific data by one or more applications therein, in order to find an appropriate remote storage device (step S1). Remote storage index server 32 maintains content, such as the remote storage device ID, corresponding capacity, available capacity and geographical location information, etc. Therefore, an appropriate remote storage device may be returned to mobile device 31 based on the geographical location information (and other requirements, such as storage demands) sent by mobile device 31 (step S2). For example, the returned remote storage device in FIG. 3 is a remote storage device located in Tokyo. Next, mobile device 31 initiates a registration request for the mobile device to returned remote storage device 33 (step S3). The registration request indicates that mobile device 31 will access remote storage device 33. In order to ensure that the latest version of the data is provided to mobile device 31, remote storage device 33 may optionally query the access history of mobile device 31 in remote storage index server 32 (step S4) and synchronize data with remote backup storage device 34 based on the access history of mobile device 31 (step S5). Finally, remote storage device 33 provides the requested data for mobile device 31. If the data is modified in the secure memory space of mobile device 31, the modification will also be synchronized back to remote storage device 33 (step S6).

Figure 4:
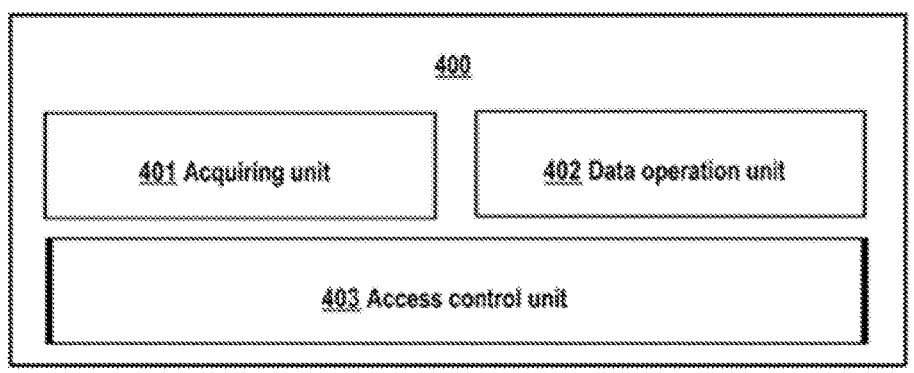
FIG. 4 shows a system 400 for providing a secure access to data in mobile devices in accordance with an exemplary embodiment of the present disclosure.

Next, system 400 for providing secure access to data in mobile devices in accordance with an exemplary embodiment of the present disclosure is described with reference to FIG. 4.

As illustrated, system 400 comprises acquiring unit 401, data operation unit 402 and access control unit 403. Acquiring unit 401 is configured to acquire data from one of a plurality of remote storage devices in response to receiving an access request for the data from one or more applications. Data operation unit 402 is configured to store data in a secure memory space of a mobile device. Access control unit 403 is configured to provide one or more applications with an access to the data in the secure memory space when a predetermined condition is satisfied, wherein the predetermined condition at least includes that one or more applications have access permission to the secure memory space. In one embodiment, acquiring unit 401, data operation unit 402 and access control unit 403 may be combined into a single module, wherein the single module may be configured to perform the tasks for each individual unit in an ordered manner.

In an embodiment of the present disclosure, acquiring data from one of a plurality of remote storage devices may include selecting the remote storage device from a plurality of remote storage devices based at least partially on geographical location information of a mobile device. In an embodiment of the present disclosure, acquiring data from one remote storage device of a plurality of remote storage devices may further include acquiring by a selected remote storage device a most recent update of the data from a remote backup storage device based at least partially on an access history of a mobile device; and transmitting the updated data to the mobile device.

In an embodiment of the present disclosure, system 400 may further include an emptying unit configured to empty a secure memory space at the end of the access to the data. In an embodiment of the present disclosure, a predetermined condition may further include at least one of signature information of an application, a type of an application and a password provided by an application. In an embodiment of the present disclosure, providing an access to data in a secure memory space may further include receiving a writing operation for the data; and periodically transmitting the written data to at least one remote storage device. In an embodiment of the present disclosure, a secure memory space is sized based at least on a number of one or more applications or a size of the data. In an embodiment of the present disclosure, storing data in a secure memory space in a mobile device may further include classifying and storing data in a secure memory space according to an application specifying the data.

Figure 5:
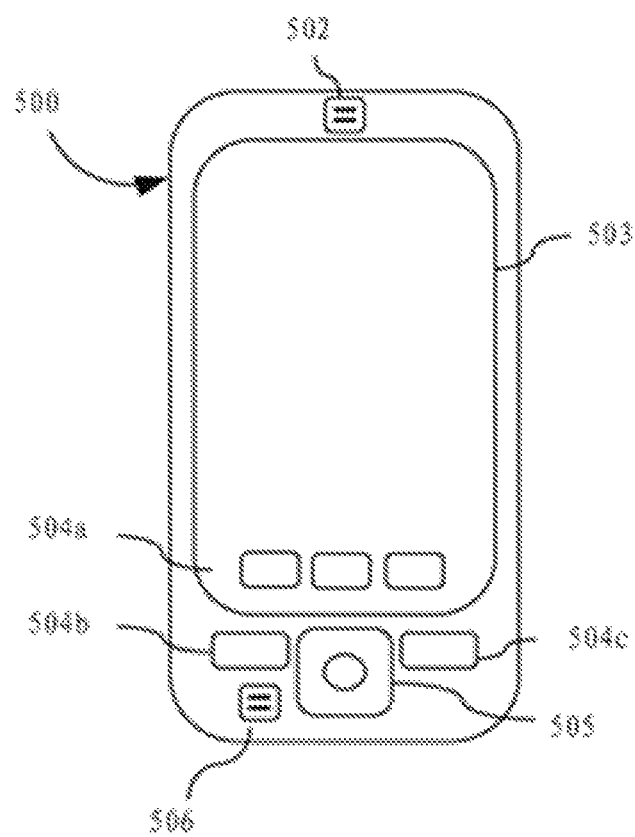
FIG. 5 shows exemplary mobile devices as shown in FIG. 2 and FIG. 3.

Now refer to FIG. 5, which shows exemplary mobile devices illustrated in FIGS. 2 and 3. As illustrated in FIG. 5, mobile device 500 includes loudspeaker or earphone 502, microphone 506, touch screen 503 and set of keys 504 that may comprise virtual key 504a, soft keys 504b, 504c and joystick 505 or navigation input devices in other types.

FIG. 6 schematically illustrates a configuration diagram of a user terminal as shown in FIG. 5. Internal components, software and protocol architecture of user terminal 500 are described with reference to FIG. 6. User terminal 500 comprises a controller 600 responsible for the overall operation of the user terminal, which may be implemented by using any business available CPU (central processing unit), DSP (digital signal processor) or any other electronic programmable logic device. Controller 600 includes associated electronic memory 602, such as RAM memory, ROM memory, EEPROM memory, flash memory or other combinations thereof. Memory 602 is used by controller 600 for various purposes, one of which is to store program instructions and data for all kinds of software in the user terminal, the software comprising real-time operation system 620, driver for Man-Machine Interface (MMI) 634, application processor 632 and various applications. The applications may include message text editor 650, handwriting recognition (HWR) application 660, and various other applications 670, such as applications for voice calls, video calls, sending and receiving Short Messaging Service (SMS) message, Multimedia Messaging Service (MMS) or E-mail, web browsing, and sending and receiving instant messages, a telephone book application, a calendar application, a control panel application, a camera application, one or more video games and a notepad application and so on. It should note that two or more of the above applications can be executed as one application.

MMI 634 further comprises one or more hardware controllers, which cooperate with first display 636/503 and small keyboard 638/504 as well as various other I/O devices (such as microphone, loudspeaker, vibrator, ring generator and LED indicator and so on) altogether with the MMI driver. As is well known, the user can operate the user terminal via a man-machine interface formed by the above components.

Software may further comprise various modules, protocol stacks and drives, which are commonly indicated as 630 and may further provide communication service (such as, transmission, network and connectivity) for RF interface 606 and optionally for Bluetooth interface 608 and/or IrDA interface. RF interface 606 comprises internal or external antennas and suitable radio circuits for establishing and maintaining the radio link leading to the base station. As generally known by those skilled in the art, the radio circuit comprises a series of analog and digital electronic components, which altogether form a radio receiver and transmitter. The components comprise, for example, band-pass filter, amplifier, mixer, local vibrator, low-pass filter and AD/DA converter etc. The user terminal may further comprise SIM card 604 and a related reader. As generally known, SIM card 604 includes a processor and a local data memory.

It should note that the embodiments of the present disclosure may be implemented by hardware, software or a combination of hardware and software. The hardware part may be implemented by special logic while the software part may be stored in a memory and executed by an appropriate instruction execution system, such as a microprocessor or special-designed hardware. Those ordinary skilled in the art can understand the above device and method can be implemented by computer executable instructions or a processor control code. In an implementation, a carrier medium, such as disc, CD or DVD-ROM, a programmable memory, such as read-only memory (firmware), or data carrier, such as optical or electronic signal carrier provide such code thereon.

The device of the present disclosure and modules thereof may be implemented by, for example, a very large scale integrated circuit or gate array, a semiconductor, such as logic chip and transistor, a field-programmable gate array or a hardware circuit of a programmable hardware device, such as programmable logic device. It can also be implemented by software executed by various types of processors and a combination of the above hardware circuit and software, such as firmware.

It should note that, although the above detailed description mentions multiple means or sub means of the device, such classification is not mandatory. In reality, according to the embodiments of the present disclosure, features and functions of two or more means described in the above content may be embodied in one means. Conversely, features and functions of one means described in the above content can further be classified to be embodied by multiple means.

Furthermore, although the drawings describe operation of the method of the present disclosure in a specific sequence, it does not necessarily require or suggest that the operation must be executed in the specific sequence or all shown operations must be executed to realize the expected result. On the contrary, the order of the steps depicted in the flow chart may be altered. Additionally or alternatively, some steps may be omitted or multiple steps may be combined into one step for execution, and/or one step may be divided into multiple steps for execution.

Although the present disclosure is described with reference to several specific embodiments, it should be understood that the present disclosure is not limited to the embodiments disclosed herein. The present disclosure is intended to encompass all kinds of modifications and equivalent arrangements included within the spirit and scope of the appended claims. The scope of the appended claims complies with the broadest interpretation so as to comprise all such modifications and equivalent structures and functions.

What is claimed is:

1. A method for providing secure access to data in mobile devices, the method comprising:
   receiving, by a mobile device, an access request for the data from one or more applications;
   in response, transmitting, from the mobile device, to a remote storage index server, a query comprising geographical location information of the mobile device;
   acquiring the data from one of a plurality of remote storage devices, in response to receiving the access request, including selecting the one remote storage device from the plurality of remote storage devices based at least partially on the geographical location information of the mobile device;
   storing the data in a secure memory space in the mobile device; and
   providing the one or more applications with access to the data in the secure memory space when a predetermined condition is satisfied, wherein the predetermined condition at least comprises the one or more applications having access permission to the secure memory space;
   wherein the mobile device is enabled to empty the secure memory space at end of access to the data.

2. The method according to claim 1, further comprising:
   acquiring, by the selected remote storage device, a most recent update of the data from a remote backup storage device based at least partially on an access history of the mobile device; and
   transmitting the most recent update of the data from the remote backup storage device to the mobile device.

3. The method according to claim 1, further comprising:
   emptying the secure memory space on completion of the access to the data.

4. The method according to claim 1, wherein the predetermined condition further comprises at least one of a signature information of the application, a type of the application and a password provided by the application.

5. The method according to claim 1, wherein providing the one or more applications with an access to data in the secure memory space further comprises:
   receiving a write operation for the data;
   writing the data; and
   periodically transmitting the written data to the remote storage device.

6. The method of claim 1, wherein the secure memory space is sized based at least on a number of the one or more applications or a size of the data.

7. The method according to claim 1, wherein storing the data in the secure memory space in the mobile device further comprises:
   classifying and storing the data in the secure memory space according to an application specific to the data.

8. A system for providing secure access to data in mobile devices, the system comprising a processor configured to:
   receive, by a mobile device, an access request for the data from one or more applications;
   in response, transmit, from the mobile device, to a remote storage index server, a query comprising geographical location information of the mobile device;
   acquire the data from one of a plurality of remote storage devices in response to receiving the access request, including selecting the one remote storage device from the plurality of remote storage devices based at least partially on the geographical location information of the mobile device;
   store the data in a secure memory space in the mobile device; and
   provide the one or more applications with access to the data in the secure memory space when a predetermined condition is satisfied, wherein the predetermined condition at least comprises the one or more applications having an access permission to the secure memory space;
   wherein the mobile device is enabled to empty the secure memory space at end of access to the data.

9. The system according to claim 8, further comprises:
   acquiring, by the selected remote storage device, a most recent update of the data from a remote backup storage device based at least partially on an access history of the mobile device; and
   transmitting most recent update of the data from the remote backup storage device to the mobile device.

10. The system according to claim 8, further configured to:
    empty the secure memory space on completion of the access to the data.

11. The system according to claim 8, wherein the predetermined condition further comprises at least one of a signature information of the application, a type of the application and a password provided by the application.

12. The system according to claim 8, wherein providing the one or more applications with an access to data in the secure memory space further comprises:
    receiving a write operation for the data;
    writing the data; and
    periodically transmitting the written data to the remote storage device.

13. The system according to claim 8, wherein the secure memory space is sized based at least on a number of the one or more applications or a size of the data.

14. The system according to claim 8, wherein storing the data in the secure memory space in the mobile device further comprises:
    classifying and storing the data in the secure memory space according to an application specific to the data.

15. A computer program product comprising:
    a non-transitory computer readable medium encoded with computer executable program code, wherein the code enables execution across one or more processors for providing a secure access to data in mobile devices, the method comprising:
    receiving, by a mobile device, an access request for the data from one or more applications;
    in response, transmitting, from the mobile device, to a remote storage index server, a query comprising geographical location information of the mobile device;
    acquiring the data from one of a plurality of remote storage devices, in response to receiving the access, including selecting the one remote storage device from the plurality of remote storage devices based at least partially on the geographical location information of the mobile device;
    storing the data in a secure memory space in the mobile device, wherein storing further comprises classifying and storing the data in the secure memory space according to an application specific to the data, and the secure memory space is sized based at least on a number of the one or more applications or a size of the data; and providing the one or more applications with an access to the data in the secure memory space when a predetermined condition is satisfied, wherein the predetermined condition at least comprises the one or more applications having an access permission to the secure memory space, and wherein the predetermined condition further comprises at least one of a signature information of the application, a type of the application and a password provided by the application;

wherein the mobile device is enabled to empty the secure memory space at end of access to the data.

16. The computer program product according to claim 15, wherein acquiring the data from one of a plurality of remote storage devices further comprises:

acquiring, by the selected remote storage device, a most recent update of the data from a remote backup storage device based at least partially on an access history of the mobile device; and transmitting the most recent update of the data from the remote backup storage device to the mobile device.

17. The computer program product according to claim 15, further comprising:

emptying the secure memory space on completion of the access to the data.

18. The computer program product according to claim 15, wherein providing the one or more applications with an access to data in the secure memory space further comprises:

receiving a write operation for the data:

writing the data; and periodically transmitting the written data to the remote storage device.

19. The method according to claim 1, wherein providing the one or more applications with access to the data includes disabling screenshot functionality of the mobile device while the access is provided.

* * * * *